UNITED STATES PATENT OFFICE.

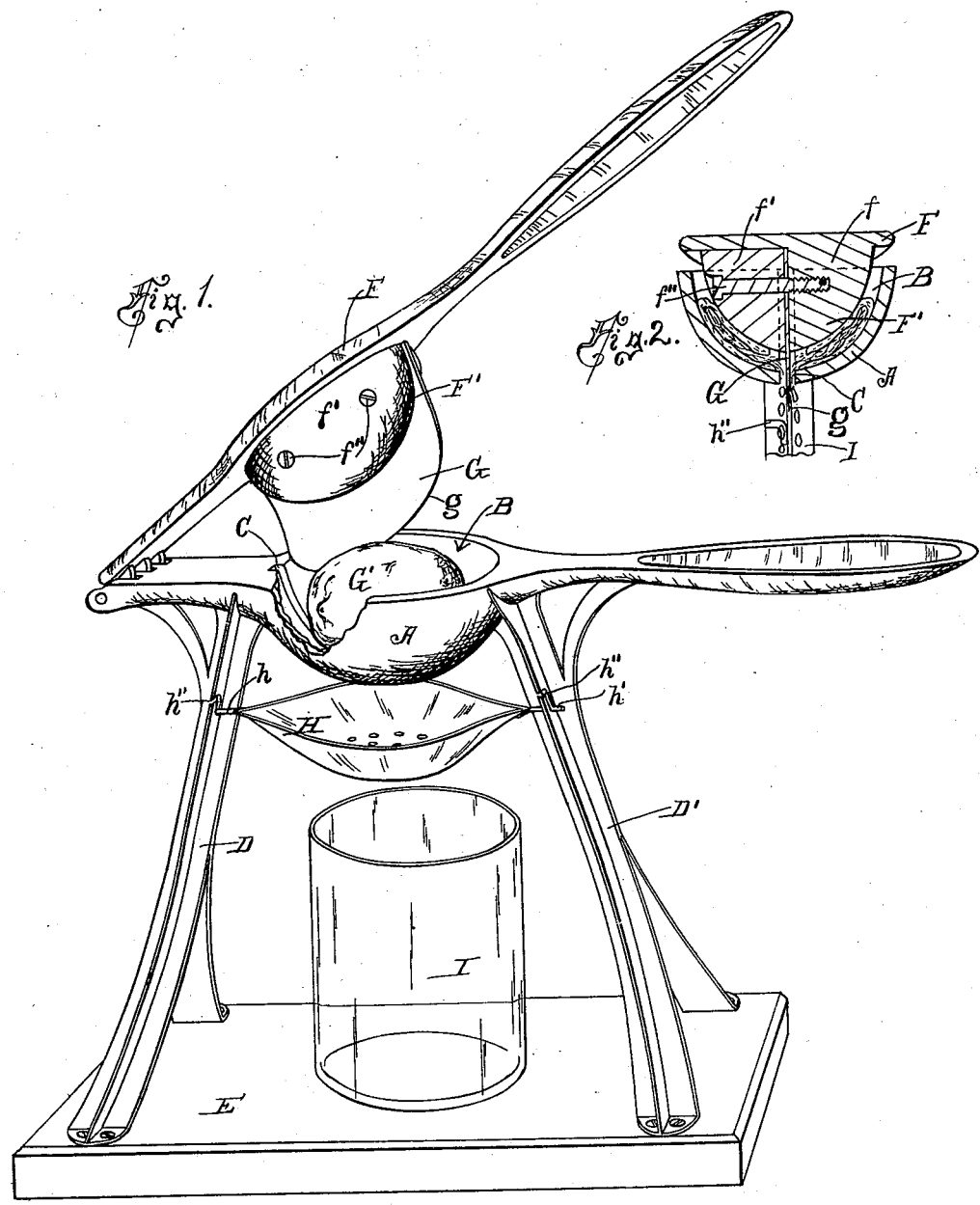

HERMAN MALINOW, OF LOS ANGELES, CALIFORNIA.

LEMON-SQUEEZER.

SPECIFICATION forming part of Letters Patent No. 560,273, dated May 19, 1896.

Application filed May 12, 1894. Serial No. 510,978. (No model.)

*To all whom it may concern:*

Be it known that I, HERMAN MALINOW, a subject of the Emperor of Russia, residing at Los Angeles, in the county of Los Angeles, State of California, have invented certain new and useful Improvements in Lemon-Squeezers, of which the following is a specification.

My invention relates to that class of lemon-squeezers in which the cutting and squeezing of the lemon are both performed by the movement of a lever which carries a knife and a lemon-engaging bulb. In squeezers of this class the juice is expelled from the lemon by compression, which forms of each half of the lemon-rind a flattened pocket, closed excepting at the severed end. After the rind is compressed to expel the juice therefrom it retains sufficient elasticity to cause it to slightly expand when the pressure of the bulb thereupon is released, and this expansion causes a suction which draws back into the lemon-rind juice remaining in proximity to the lips thereof. As heretofore constructed, the operation of squeezing the lemon forces the rind firmly upon and thus closes the only openings provided for the escape of the juice from the squeezer, so that when the pressure upon the lemon-rind is relieved to allow the rind to be removed from the squeezer the elasticity of the rind causes it to expand and produce a suction which draws a large portion of the juice back into the rind.

One object of my invention is to provide a lemon-squeezer of this character in which the operation of squeezing the lemon can be more conveniently performed with the exercise of less skill and power than with the lemon-squeezers of this character heretofore made and without waste or squirting of juice.

Another object of my invention is to provide a lemon-squeezer of this class which is devoid of all liability of clogging and in which the operation of the implement in the act of squeezing the lemon will serve to free the juice outlet or passage from any accumulation of pulp or seeds which might possibly occur, and to keep such outlet open.

Another object of my invention is to provide a lemon-squeezer of great simplicity and of cheap manufacture in which the lemon-cutting knife is conveniently removable and is easily replaced in proper position for use in the implement and whereby great convenience in sharpening the knife or replacing a worn knife is secured.

One particular object of my invention is to construct a lemon-squeezer of the class above mentioned in which the lemon may be properly placed for squeezing without any care upon the part of the operator toward properly adjusting the same in position to be squeezed. I accomplish this particular object by a very simple and inexpensive construction—viz., the lower or lemon-holding member of the squeezer is provided with a concavity, the floor of which slopes from the sides down toward its middle and is devoid of any other openings through which the juice may escape, and also provided with a longitudinal knife-receiving and juice-discharging slot cutting through the floor of the concavity and opening downward therefrom from the surface thereof and having its upper margin flush with the floor of the concavity and arranged to allow the expressed juice to flow downward through the slot through which the lemon-cutting knife works.

The lemon receptacle or concavity is sufficiently large to fully chamber a lemon. This concavity in the lower member or cup is, in actual practice, an oblong oval pocket, as indicated in Figure 1, and it is deep enough to almost fully chamber a lemon of ordinary size, as indicated in said Fig. 1, and is large enough to receive a large lemon. The shape of the concavity corresponds to that of half a lemon. The slot extends lengthwise of the concavity or pocket along the mid-line thereof, so that the lemon when placed in the cup will naturally roll into position with its length along the slot and not across it, it being an object of my invention to split the lemon from end to end instead of cutting it crosswise for the reason that when the lemon is cut lengthwise the lemon juice can be expressed from the rind easier than is the case where the lemon is cut crosswise. The juice near the end does not have to pass so far through the pulp and between the rinds to escape. Another purpose of cutting the lemon lengthwise is to increase the ease with which the lemon is squeezed dry, it requiring less pressure to expel the juice from within the rind when the lemon is split lengthwise than when it is cut crosswise.

I am not aware of any lemon-squeezer which is designed or adapted to operate to automatically adjust the lemon and hold it in position to be split lengthwise.

The accompanying drawings illustrate my invention.

Fig. 1 is a perspective side elevation of my improved lemon-squeezer in which a lemon is placed ready to be operated upon. A portion of the lemon-receiving pocket is broken away to expose the interior of the pocket and a portion of the lemon which is shown therein. Fig. 2 is a cross-section of my improved lemon-squeezer, showing therein the rind of a lemon which has been squeezed. In this view the parts of the squeezer which are shown are shown in the position they occupy when the lemon has been squeezed.

In the drawings, A indicates the lower member of the squeezer, and B indicates the lemon-receiving pocket or concavity, and C indicates the knife-receiving and juice-discharging slot. The lower member is provided with suitable supporting-legs D D', secured to a suitable base E.

F indicates the upper member or squeezing-lever hinged at its rear end to the lower member and provided with a squeeing-bulb F' and with a lemon-severing knife G, which projects downward below the bulb and is arranged to pass through the slot C in the floor of the lemon-receiving pocket or concavity B.

I will now describe my invention with relation to the lever, bulb, and knife. The operating lever or handle F is provided on its under side with a segmental projection $f$, cast integral with or otherwise fixed on or rigidly secured to the lever and arranged to form one-half of the lemon-squeezing bulb F'. The outer face of this projection $f$ is curved to conform approximately to the shape of the lemon-receiving pocket B, and its inner face is vertical and extends along the line of one side of the slot C and above the same and forms one face of the seat for the lemon-cutting knife G, which is seated thereon.

$f'$ is a detachable bulb-segment fitted to the angle between the knife and the under face of the lever, and it and the knife-blade are provided with screw-holes, through which are inserted the screws $f''$, which in practice screw into the downward projection $f$, so that when the knife G is seated against the flat side of the projection $f$ and the bulb-segment $f'$ is fastened in place by the screws $f'''$ the knife will be firmly fixed in the center of the bulb and in line with the slot. The knife is so set that its cutting edge $g$ stands at an angle with the axis of the lever F, in order to give a shear-like motion to the knife when cutting the lemon. I find this to be very essential to the successful operation of the device, and that if the edge is set parallel with the axis of the lever it requires much more force to cut the lemon, and the juice is liable to squirt out by reason of the compression of the rind of the lemon by the knife-edge.

The operation is as follows: A whole lemon is placed in the lemon-receiving pocket or concavity, as shown in Fig. 1, and it is guided by the sloping floor of the socket into position, with its mid-line extending along the line of the knife-receiving and juice-discharging slot. The smooth concave pocket, devoid of any projections and sloping from all sides down to the mouth of the slot, causes the lemon to take this position naturally by the force of gravity, and the operator is not required to adjust the lemon further than to drop it into the concavity. The lever F is then depressed, thus bringing the knife first into contact with the rear end of the lemon—that is to say, that portion of the lemon which is nearest to the hinge of the lever, as indicated in said Fig. 1. When the knife has cut along the whole length of the rind and is fully inserted into the lemon, the segmental members $f f'$ of the lemon-squeezing bulb engage the lemon and begin to press the rind downward with the knife, and the knife enters the slot and the bulb presses on down until the juice is fully squeezed from the lemon. During this operation the severed pulp of the lemon remains in contact with the knife and is thus held in place within the rind, while the juice is squeezed out against the sides of the knife and flows down along the knife and through the knife-receiving juice-discharging slot C. When the lemon is fully squeezed, the lever is raised, thus withdrawing the knife from the slot. The rind is then removed and the operation repeated with another lemon, and so on. At each operation the knife passes down through the juice-discharging slot, thus keeping it free from possibility of clogging by any pulp or seeds which may escape from the rind.

By the arrangement of the knife and concavity and slot, as shown, the juice is prevented from spreading over the inside of the lemon-pocket. The tendency of the two concave outer faces of the squeezing-bulb on opposite sides of the knife during the operation of squeezing the lemon is to force each half of the lemon slightly away from the slot C, so that the discharge of the juice is never obstructed by the lemon-rind in the way it is in lemon-squeezers having the pocket provided with perforations in the usual manner. Thus with my improved device there is no chance for the juice to be sucked back into the rind, as has been the case with lemon-squeezers of this class as heretofore constructed. A strainer H is arranged below the pocket B and is supported in place by means of trunnions $h$ $h'$, which are seated in L-shaped slots $h''$ in the legs of the base. This strainer is provided with sloping sides, and in practice operates as a funnel to catch the juice discharged through the slot C and to conduct it into the tumbler I or other receptacle placed beneath the slot to receive the juice.

It is to be observed that the floor of the lemon receptacle or concavity is made without any of the usual perforations, and its only opening is the slot, thus avoiding the expense of making such holes and also avoiding the accumulations of pulp, which are liable to be caught in the perforations of the lemon-squeezers to which this improvement relates.

I am aware that it has been proposed to mount a knife on the under side of a lever and provide such lever with two semiconvexed squeezers for squeezing the lemon and to provide beneath the same a lemon receiving and straining cup formed in two halves, each provided with a concaved upper surface and perforated to permit the passage of the juice of the lemon therethrough, curved flanges to partially surround the edge of said cup, and the adjacent edges of the sections to be provided with transverse flanges which are slightly spaced apart to form a recess for the reception of the lower edge or blade of the knife.

My invention is to be distinguished from such construction, for I dispense with the transverse flanges and discharge the juice through the slot through which the knife plays instead of through perforations in the floor, and thereby produce a much more satisfactory operation of the squeezer, besides avoiding the liability of clogging to which the perforations are subject. It may be further remarked that in the former construction the machine was designed for cutting the lemon transversely, and each cup or concavity was arranged to receive one end of the lemon when cut transversely. In such machine the transverse flanges would prevent the lemon from seating and automatically adjusting itself by gravity, and therefore it would be necessary for the operator to hold the lemon in place until engaged by the knife, and this could most conveniently be done by holding it by one end, and with a machine of that kind there would be great difficulty in holding the lemon so as to split it along its length, as is done in the operation of my squeezer.

Another feature of the proposed machine which was made necessary by the presence of the flanges was that the semiconvexed squeezers attached to the handle had to be recessed to receive the transverse flanges in order that the squeezers might press down to the bottoms of the cups. My improved construction is much stronger than the proposed construction for the reason that I dispense with said flange-receiving recesses, and in my device the bulb fits the knife-blade along its entire length, and then there is no crevice for accumulations of pulp along the blade.

Furthermore, my device is much cheaper in construction than said proposed machine, which is provided with perforations through the bottom of its squeezing-cup, and I secure a better discharge of the juice and avoid spreading it over the rind of the lemon as it would have to spread in the other machine before it is discharged. I dispense with the numerous perforations heretofore deemed necessary.

It is to be noticed that the width of the juice-discharging and knife-receiving slot is considerably greater than the thickness of the knife-blade. This is necessary for the passage of the juice, &c., in a way to make the squeezer practical. In the said proposed machine the slot for the knife was narrow. It was neither designed nor adapted for discharging the expressed juice from the machine.

Now, having described my invention, what I claim as new, and desire to secure by Letters Patent, is—

1. A lemon-squeezer of the class specified provided with a lemon-holding member and a lemon-cutting knife, and having its lemon-holding member provided with a concavity, and also provided with a longitudinal knife-receiving and juice-discharging slot opening through the floor of the concavity downward from the surface thereof, and having its upper margin flush with the floor of the concavity and arranged as specified, so as to allow the expressed juice to flow downward from the concavity through the slot through which the lemon-cutting knife works.

2. The combination set forth of the lemon-holding member provided with a concavity, and also provided with a longitudinal knife-receiving and juice-discharging slot opening through the floor of the concavity downward from the surface thereof, and having its upper margin flush with the floor of the concavity and arranged so as to allow the expressed juice to flow downward through the slot; a lever hinged to the lemon-holding member and provided with a bulb arranged to enter the concavity, and with a knife projecting from such bulb and arranged to enter the slot.

HERMAN MALINOW.

Witnesses:
ALFRED I. TOWNSEND,
F. M. TOWNSEND.